(12) United States Patent
Hanaki et al.

(10) Patent No.: US 8,417,274 B2
(45) Date of Patent: Apr. 9, 2013

(54) BASE STATION, RADIO COMMUNICATION SYSTEM, AND RADIO COMMUNICATION METHOD

(75) Inventors: Akihito Hanaki, Yokohama (JP); Yoshikazu Goto, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/059,827

(22) PCT Filed: Aug. 19, 2009

(86) PCT No.: PCT/JP2009/064501
§ 371 (c)(1),
(2), (4) Date: May 12, 2011

(87) PCT Pub. No.: WO2010/021337
PCT Pub. Date: Feb. 25, 2010

(65) Prior Publication Data
US 2011/0218006 A1    Sep. 8, 2011

(30) Foreign Application Priority Data

Aug. 19, 2008    (JP) ................................ 2008-210960

(51) Int. Cl.
*H04B 7/00* (2006.01)
(52) U.S. Cl.
USPC ..................... 455/509; 455/67.11; 455/151.2; 455/452.1; 455/453; 370/232; 370/235; 370/329
(58) Field of Classification Search .................. 455/509, 455/39, 67.11, 151.1, 151.2, 422.1, 445, 455/450, 452.1, 452.2, 453; 370/232, 235, 370/253, 310.2, 328, 329; 379/219
See application file for complete search history.

(56) References Cited

U.S. PATENT DOCUMENTS

2006/0189323 A1    8/2006    Usuda et al.
2007/0135131 A1    6/2007    Ishii et al.

FOREIGN PATENT DOCUMENTS

EP    1 796 331    6/2007
JP    2004 328638    11/2004

(Continued)

OTHER PUBLICATIONS

3GPP TS 25 321 V7.5.0, "3rd Generation Partnership Project. Technical Specification Group Radio Access Network; Medium Access Control (MAC) Protocol Specification (Release 7)." 3GPP™, pp. 2-141, (Jun. 2007).

(Continued)

*Primary Examiner* — Shaima Q Aminzay
(74) *Attorney, Agent, or Firm* — Oblon, Spivak, McClelland, Maier & Neustadt, L.L.P.

(57) ABSTRACT

A base station includes a scheduling unit 120a and a call admission control unit 120b. The scheduling unit 120a includes a first determination unit 126 to determine whether or not a transmission frequency of transmission rate control data for decreasing transmission rate for uplink data is equal to or higher than a transmission frequency threshold, a second determination unit 127 to determine whether or not a counted number value of rate lowering event occurrences exceeds a counted number threshold, the rate lowering event being an event that decreases transmission rate for uplink data, and a setting unit 128 to set admission permission information to information for limiting an admission of a new call in a case where the transmission frequency is equal to or higher than the predetermined frequency, and where the counted number value of rate lowering event occurrences exceeds the counted number threshold. The call admission control unit 120b determines whether or not to permit the admission of a new call based on the admission permission information set by the scheduling unit 120a.

9 Claims, 7 Drawing Sheets

FOREIGN PATENT DOCUMENTS

JP   2006 270942   10/2006
JP   2007 159054   6/2007

OTHER PUBLICATIONS

3GPP TS 25.212 V7 5.0, "3rd Generation Partnership Project: Technical Specification Group Radio Access Network; Multiplexing and Channel Coding (FDD) (Release 7)," 3GPP™, pp. 2-103, (May 2007).

3GPP TS 25 427 V7 5.0. "3rd Generation Partnership Project. Technical Specification Group Radio Access Network; UTRAN lub/lur Interface User Plane Protocol for DCH Data Streams (Release 7)," 3GPP™, pp. 2-44, (Sep. 2007).

International Search Report issued Sep. 15. 2009 in PCT/JP09/064501 filed Aug. 19, 2009.

BASE STATION, RADIO COMMUNICATION SYSTEM, AND RADIO COMMUNICATION METHOD

TECHNICAL FIELD

The present invention relates to a base station, a radio communication system, and a radio communication method that assign a radio resource for uplink data.

BACKGROUND ART

Conventionally, a radio communication system has been known that includes base stations and radio network controllers. The base station includes one or more of cells, and each cell performs radio communication with radio terminals. The radio network controller manages multiple base stations and assigns a radio resource to a radio terminal. Note that such a technique (hereinafter, first technique) may be referred to as an R99 (Release 99) and the like.

In recent years, a technique has been proposed in which a base station (network side) performs the assignment of a radio resource for uplink data from a radio terminal to the base station and any other operation for the purpose of improving throughput and reducing delay time. Such a technique (hereinafter, second technique) may be referred to as HSUPA (High Speed Uplink Packet Access), EUL (Enhanced Uplink), and the like.

Each cell may function as a serving cell in some cases and as a non-serving cell in other cases. Transmission rate (for example, TBS (Transport Block Size) determined by SG (Scheduling Grant)) for uplink data is controlled by transmission rate control data transmitted from the serving cell and the non-serving cell. The transmission rate control data includes absolute transmission rate control data (AG; Absolute Grant) for directly specifying the transmission rate and relative transmission rate control data (RG; Relative Grant) for relatively specifying the transmission rate (for example, 3GPP TS25.321 Ver. 7.5.0).

Here, the uplink data is transmitted from a radio terminal to a base station through an E-DPDCH (Enhanced Dedicated Physical Data Channel). The absolute transmission rate control data (AG) is transmitted from the radio terminal to the base station through an E-AGCH (E-DCH Absolute Grant Channel). The relative transmission rate control data (RG) is transmitted from the radio terminal to the base station through an E-RGCH (E-DCH Relative Grant Channel).

The serving cell transmits the absolute transmission rate control data (AG) and the relative transmission rate control data (RG) to the radio terminal. On the other hand, the non-serving cell only transmits the relative transmission rate control data (RG) to the radio terminal without transmitting the absolute transmission rate control data (AG).

A base station according to the second technique includes a call admission control unit that controls whether or not to receive a new call and a scheduling unit that controls a radio resource (transmission rate) to be assigned for uplink data. The scheduling unit transmits absolute transmission rate control data (AG) or relative transmission rate control data (RG). As types of TTI (Transmission Time Interval) of uplink data, there are 2-msec TTI and 10-msec TTI corresponding to the length of 1 TTI. In the case of the 2-msec TTI, the scheduling unit can transmit the absolute transmission rate control data (AG) or the relative transmission rate control data (RG) at each TTI.

Here, a method can be considered in which; the scheduling unit measures the frequency of the occurrences of events where a target transmission rate is not achieved in a control cycle; and the call admission unit denies to receive a new call in the next control cycle when the frequency of the occurrences is high (for example, Japanese Patent Application Publication No. 2007-159054).

Unfortunately, in the second technique (EUL), even when the base station measures the transmission rate, the resulting transmission rate may fall below the target transmission rate due to a factor in an upper level device of the base station.

Moreover, in the second technique (EUL), even though the target transmission rate is achieved, shortage of radio resources to be shared with the first technique (R99) may occur to thereby adversely affect the quality of a call in the first technique (R99).

As described above, the admission of a new call has not been able to be appropriately controlled in accordance with the frequency of the occurrences of the events in which the target transmission rate is not achieved.

SUMMARY OF THE INVENTION

A base station according to the first feature comprises a scheduling unit configured to assign a radio resource used for receiving uplink data by transmitting transmission rate control data for controlling transmission rate for uplink data, and a call admission control unit configured to control an admission of a call. The scheduling unit includes a first determination unit configured to determine whether or not a transmission frequency of transmission rate control data for decreasing transmission rate for uplink data is equal to or higher than a transmission frequency threshold, a second determination unit configured to determine whether or not a counted number value of rate lowering event occurrences exceeds a counted number threshold, the rate lowering event being an event that decreases transmission rate for uplink data, and a setting unit configured to set admission permission information to information for limiting an admission of a new call in a case where the transmission frequency is equal to or higher than the predetermined frequency, and where the counted number value of rate lowering event occurrences exceeds the counted number threshold. The call admission control unit determines whether or not to permit the admission of a new call based on the admission permission information set by the scheduling unit.

MODES FOR CARRYING OUT THE INVENTION

A radio communication system according to an embodiment of the present invention is described below with reference to the drawings. In the description of the drawings below, the same or similar elements are given the same or similar reference numerals.

In addition, it should be noted that the drawings are schematic and ratios of dimensions and the like are different from actual ones. Therefore, specific dimensions and the like should be determined in consideration of the following description. Moreover, the drawings also include portions having different dimensional relationships and ratios from each other.

[Overview of Embodiment]

An overview of the embodiment is simply described below. A base station according to the embodiment includes a scheduling unit that assigns a radio resource used for the reception of uplink data and a call admission control unit that controls an admission of a call. Each of the scheduling unit and the call admission control unit operates independently.

The scheduling unit sets an admission permission flag to information that limits (denies) the admission of a new call in the following case. Specifically, the information is set when a transmission frequency of transmission rate control data for decreasing the transmission rate for uplink data is equal to or higher than a transmission frequency threshold and a counted number value of rate lowering event occurrences exceeds a counted number threshold. The call admission control unit determines whether or not the admission of a new call is permitted based on the admission permission flag set by the scheduling unit.

Here, it is highly likely that there is no capacity for permitting the admission of a new call when the transmission frequency of the transmission rate control data for decreasing the transmission rate for uplink data is equal to or higher than the transmission frequency threshold. Also, it is highly likely that there is no capacity for permitting the admission of a new call when the counted number value of rate lowering event occurrences exceeds the counted number threshold.

The scheduling unit sets the admission permission flag to the information for limiting (denying) the admission of a new call while taking into consideration both the transmission frequency and the counted number value of the rate lowering events.

Thus, the call admission control unit does not need to inquire of the scheduling unit the radio resource assigned for the reception of uplink data each time a new call is received, and can limit (deny) the admission of a new call when it is highly likely that there is no capacity for permitting the admission of a new call.

Here, a single cycle includes multiple processes. A transmission time interval length of the TTI (Transmission Time Interval) between the processes may vary among multiple radio terminals or in a single radio terminal in accordance with an instruction of a radio network controller. In such an environment, a timing at which transmission rate control data (AG; Absolute Grant) can be transmitted varies among the TTIs.

Accordingly, in the embodiment, whether or not the timing at which the transmission rate control data (AG) can be transmitted is determined. The timing at which the transmission rate control data (AG) can be transmitted is counted as a count target frame number. Then, the ratio of "the number of frames in which a rate lowering event has occurred" to "the number of count target frames" is calculated as the transmission frequency of the transmission rate control data for lowering the transmission rate for uplink data.

Thus, a radio terminal to which different TTIs are assigned can be treated integrally and the transmission frequency can be appropriately calculated. Thus, the admission of a new call can be appropriately controlled.

[First Embodiment]

(Configuration of Radio Communication System)

Figure 1:
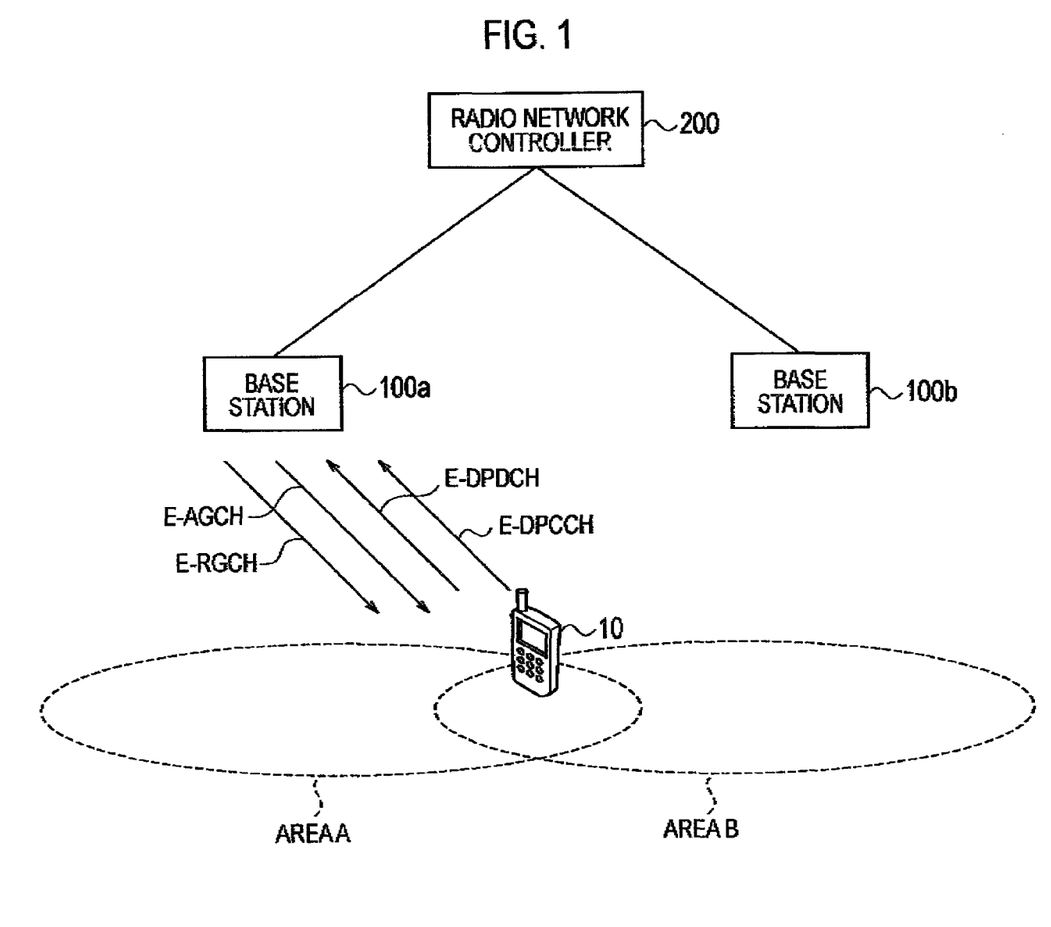
FIG. 1 is a diagram showing a radio communication system according to a first embodiment of the present invention.

The configuration of a radio communication system according to a first embodiment of the present invention is described below with reference to the drawings. FIG. 1 is a diagram showing the radio communication system according to the first embodiment.

As shown in FIG. 1, the radio communication system includes a radio terminal 10, base stations 100 (base station 100a and a base station 100b), and a radio network controller 200. FIG. 1 shows a case where the radio terminal 10 communicates with the base station 100a.

The radio terminal 10 transmits uplink data to the base station 100a. More specifically, the radio terminal 10 transmits the uplink data to the base station 100a through a DPDCH (Dedicated Physical Data Channel) in a framework in which the radio network controller 200 performs radio resource assignment and the like. The framework in which the radio network controller 200 performs the radio resource assignment and the like may be referred to as R99 (Release 99) and the like.

The radio terminal 10 transmits the uplink control data to the base station 100a through a DPCCH (Dedicated Physical Control Channel) in the framework in which the radio network controller 200 performs the radio resource assignment and the like.

Note that transmission power of the DPCCH is controlled by a TPC command, received by the radio terminal 10 from the base station 100 as in the case of general closed-loop power control. The TPC command is a command generated by the base station 100 by comparing a receiving quality of an uplink signal with a target quality thereof.

Meanwhile, the radio terminal 10 transmits uplink data to the base station 100a through an E-DPDCH (Enhanced Dedicated Physical Data Channel) in a framework in which the base station 100 performs the radio resource assignment and the like. The framework in which the base station 100 performs the radio resource assignment and the like may be referred to as HSUPA (High Speed Uplink Packet Access), EUL (Enhanced Uplink), and the like.

Here, the uplink data is divided into blocks for each TTI (Transmission Time Interval), i.e., for each process (an HARQ processing). Each of the blocks is transmitted using a process (hereinafter, referred to as an active process) assigned to the radio terminal 10.

A predetermined number of processes (process #1 to process #n) from which a single cycle (HARQ RTT) is formed are repeated for each cycle. The number of processes to be included in a single cycle is determined in accordance with a TTI length. For example, when the TTI length is 2 ms, the number of processes included in a single cycle is "8". When the TTI length is 10 ms, the number of processes included in a single cycle is "4".

Here, the radio terminal 10 has a table for associating a transmission power ratio with the transmission rate for uplink data transmitted through the E-DPDCH. The transmission power ratio is a ratio of the transmission power of the E-DPDCH to the transmission power of the DPCCH (E-DPDCH/DPCCH). The transmission rate is represented by TBS (Transport Block Size).

In the following, the transmission power ratio assigned to the radio terminal 10 is referred to as SG (Scheduling Grant). The SG (Scheduling Grant) may be considered not only as a term that represents the transmission power ratio assigned to the radio terminal 10 but also as the term that represents the transmission rate assigned to the radio terminal 10. This is because the transmission power ratio and the transmission rate are associated one-to-one with each other. It is to be noted that the transmission rate assigned to the radio terminal 10 is an example of the radio resource in the first embodiment.

As will be described later, the radio terminal 10 updates the SG in accordance with the transmission rate control data (AG or RG described later) received from the base station 100a (see 3GPP TS25.321 Ver. 7.5.0, Section 11.8.1.3 "Serving Grant Update"). Next, the radio terminal 10 determines the transmission rate (i.e., TBS) corresponding to the SG by referring to the table for associating the transmission power ratio with the transmission rate (see 3GPP TS25.321 Ver. 7.5.0, Section 11.8.1.4 "E-TFC Selection").

In the framework in which the base station 100 performs the radio resource assignment and the like, the radio terminal 10 transmits the uplink control data to the base station 100a through an E-DPCCH (Enhanced Dedicated Physical Control Channel), the E-DPDCH, or the like. The uplink control data includes scheduling information (UL Scheduling Information) which is referred to by the base station 100a for the radio resource assignment.

The scheduling information includes "HLID (Highest priority Logical Channel ID)", "TEES (Total E-DCH Buffer Status)", "HLBS (Highest priority Logical Channel Buffer Status)", "UPH (User Power Headroom)" and the like. The uplink control data other than the scheduling information includes "Happy Bit", "CQI" and the like (see 3GPP TS25.321 Ver. 7.5.0, Section 9.2.5.3 "UL Scheduling Information").

The "HLID" is an identifier for identifying a logical channel with the highest priority among logical channels for transporting uplink data.

The "TEBS" is information that indicates an amount (buffer amount) of uplink data accumulated in the transmission buffer provided in the radio terminal 10.

The "HLBS" is an amount (buffer amount) of uplink data corresponding to the logical channel identified by the HLID among the uplink data accumulated in the transmission buffer provided in the radio terminal 10.

The "UPH" is a transmission power ratio that is a ratio of the maximum transmission power (Maximum UE Transmission Power) to the transmission power of the DPCCH. The maximum transmission power is the maximum transmission power allowed for the radio terminal 10. For example, the UPH is represented by "maximum transmission power"/"transmission power of DPCCH".

The "Happy Bit" is happiness information that indicates whether or not the SG assigned to the radio terminal 10 is sufficient. The types of the "Happy Bit" includes "Happy" indicating that the SG assigned to the radio terminal 10 itself is sufficient and "Unhappy" indicating that the SG assigned to the radio terminal 10 itself is not sufficient. The "Happy Bit" is expressed by 1 bit.

The "CQI" is a receiving quality value indicating the receiving quality of a downlink signal (e.g., CPICH; Common Pilot Channel) received by the radio terminal 10 from the base station 100.

Figure 2:
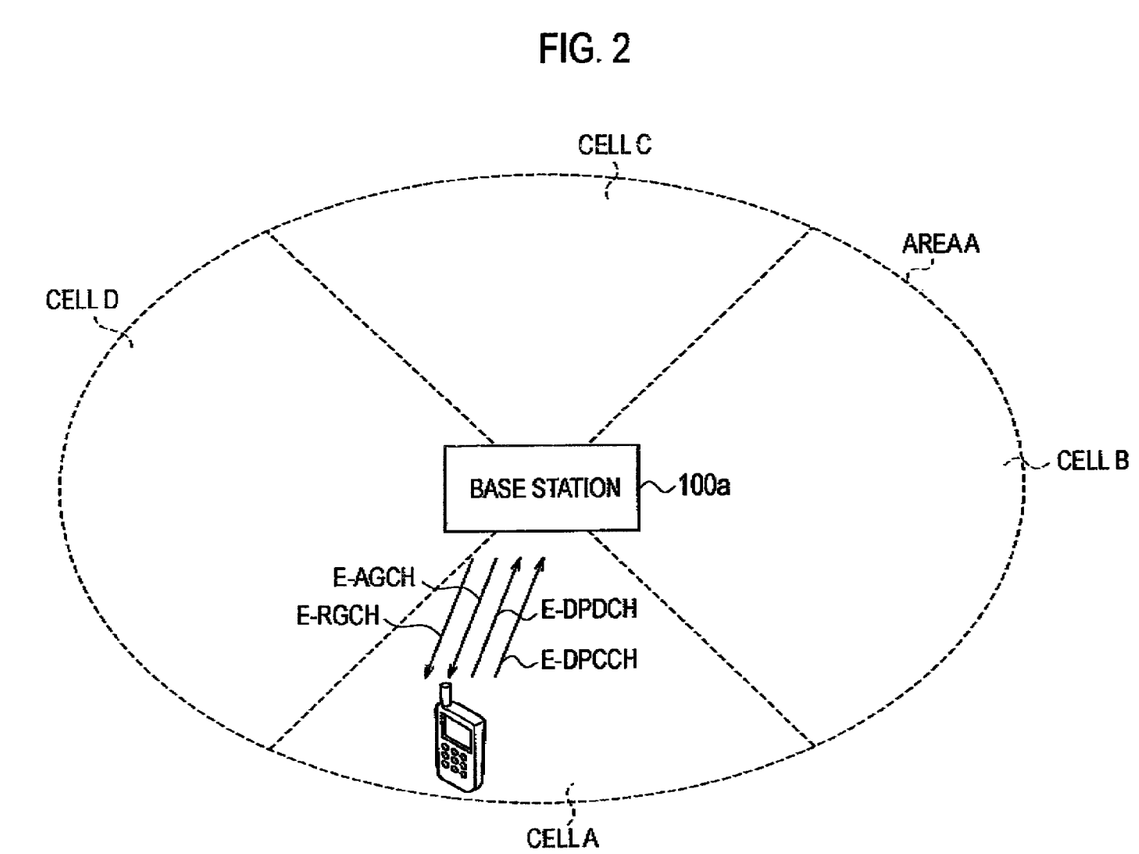
FIG. 2 is a diagram showing a radio communication system according to a first embodiment of the present invention.

As shown in FIG. 2, the base station 100a includes multiple cells (cell A to cell D), and each cell communicates with the radio terminal 10 located therein. Each cell may function as a serving cell in some cases and as a non-serving cell in other cases.

It is to be noted that "cell" is basically used as a term representing a function for communicating with the radio terminal 10. "Cell" may also be used as a term representing an area in which the radio terminal 10 is located.

A case is exemplarily considered in which the radio terminal 10 is executing communications in accordance with an instruction of an ELM scheduler provided in the cell A in FIG. 2 (i.e., a case in which the communications are executed in accordance with AG received from the cell A through the E-AGCH). In this case, the cell A is the serving cell for the radio terminal 10 and the cells B to D are the non-serving cells for the radio terminal 10. On the other hand, the radio terminal 10 is a serving terminal for the cell A and a non-serving terminal for the cells B to D.

The base station 100 receives uplink data from the radio terminal 10 through a data channel such as the DPDCH and the E-DPDCH. On the other hand, the base station 100 transmits to the radio terminal 10, transmission rate control data for controlling a transmission rate for uplink data transmitted through the E-DPDCH. The transmission rate control data includes the absolute transmission rate control data (AG; Absolute Grant) for directly specifying the transmission rate and the relative transmission rate control data (RG; Relative Grant) for relatively specifying the transmission rate.

The absolute transmission rate control data (AG) is data (Index) for directly specifying the transmission power ratio (E-DPDCH/DPCCH) assigned to the radio terminal 10 (see 3GPP TS25.212 Ver. 7.5.0, Section 4.10.1A.1 "Information field mapping of the Absolute Grant Value").

As described above, the absolute transmission rate control data (AG) is a command directly specifying the transmission rate value regardless of the current transmission rate.

The relative transmission rate control data (RG) is data ("Up", "Down", "Hold") for relatively specifying the transmission power ratio (E-DPDCH/DPCCH) assigned to the radio terminal 10 (see 3GPP TS25.321 Ver. 7.5.0, Section 9.2.5.2.1 "Relative Grants").

As described above, the relative transmission rate control data (RG) is a command relatively controlling the current transmission rate. Specifically, the relative transmission rate control data (RG) includes an increase command "Up" for instructing an increase of the current transmission rate, a maintenance command "Hold" for instructing maintenance of the current transmission rate, and a decrease command "Down" for instructing a decrease of the current transmission rate. The increase command is a command instructing a predetermined range of increase, and the decrease command is a command instructing a predetermined range of decrease. The predetermined range of increase may have the same range as the predetermined range of decrease, or may have smaller range than the predetermined range of decrease.

The base station 100a transmits the AG to the radio terminal 10 through the absolute transmission rate control channel (E-AGCH; E-DCH Absolute Grant Channel). The base station 100a transmits the RG to the radio terminal 10 through the relative transmission rate control channel (E-RGCH; E-DCH Relative Grant Channel).

For example, the serving cell (the cell A in this case) transmits the AG to the radio terminal through the E-AGCH, and transmits the RG to the radio terminal 10 through the E-RGCH. On the other hand, the non-serving cell (the cell B in this case) does not transmit the AG to the radio terminal through the E-AGCH, but transmits the RG to the radio terminal 10 through the E-RGCH.

It is to be noted that the channels (DPCCH, DPCCH, and the like) used for the R99 are not shown in FIG. 1 and FIG. 2 only to simplify the description. It is to be noted also that a number of radio terminals 10 are present in each of the cells in practice.

The cell used as the serving cell by the radio terminal 10 is not limited to a single cell but may also be multiple cells.

It is to be noted that in the transmission of uplink data in accordance with the 2-msec TTI, the transmission rate assigned to the radio terminal 10 can be controlled by the transmission rate control data (AG and RG) for each TTI. On the other hand, in the transmission of uplink data in accordance with the 10-msec TTI and the R99, the transmission rate assigned to the radio terminal 10 can be controlled only by an interval longer than 1 TTI.

(Configuration of Base Station)

Figure 3:
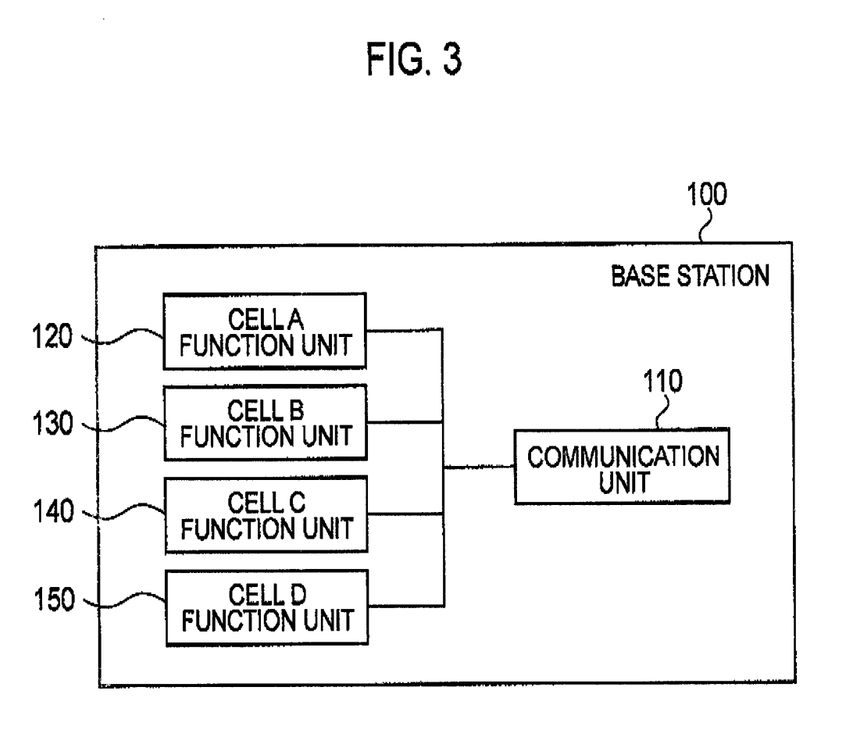
FIG. 3 is a block diagram of a base station 100 according to the first embodiment of the present invention.

A configuration of the base station according to the first embodiment is described below with reference to the drawings. FIG. 3 is a block diagram of the base station 100 according to the first embodiment.

As shown in FIG. 3, the base station 100 includes a communication unit 110, a cell A function unit 120, a cell B function unit 130, a cell C function unit 140, and a cell ID function unit 150.

The communication unit 110 communicates with the radio terminal 10 located in the cell A to cell D. More specifically, the communication unit 110 receives uplink control data from the radio terminal 10 through a control channel such as the DPCCH, E-DPCCH, or E-DPDCH. The communication unit 110 receives the scheduling information from the radio terminal 10 through a control channel such as the DPCCH or E-DPCCH. On the other hand, the communication unit 110 transmits transmission rate control data (AG and RG) to the radio terminal 10 through a control channel such as the E-AGCH or E-RGCH.

The communication unit 110 also communicates with an upper level station (radio network controller, exchange, and the like) that manages the base station 100. More specifically, the communication unit 110 is connected to the upper level station (radio network controller, exchange, and the like) through a wired transmission path. The wired transmission path includes a transmission path (Iub interface) established between the base station 100 and the radio network controller, and a transmission path (Iur interface) established between the radio network controllers (between DRNC and SRNC). Whether or not the Iur interface is established between the base station and the SRNC is determined separately for each radio terminal 10 (UE; User Equipment). Thus, the wired transmission path according to the first embodiment can be regarded as being established for each radio terminal 10 (UE; User Equipment).

The cell A function unit 120 functions as the serving cell for the radio terminal 10 located in the cell A. On the other hand, the cell A function unit 120 serves as the non-serving cell for the radio terminals 10 located in the cell B to the cell D.

The cell B function unit 130 functions as the serving cell for the radio terminal 10 located in the cell B. On the other hand, the cell B function unit 130 serves as the non-serving cell for the radio terminals 10 located in the cell A, the cell C and the cell D.

The cell C function unit 140 functions as the serving cell for the radio terminal 10 located in the cell C. On the other hand, the cell C function unit 140 serves as the non-serving cell for the radio terminals 10 located in the cell A, the cell B and the cell D.

The cell D function unit 150 functions as the serving cell for the radio terminal 10 located in the cell D. On the other hand, the cell D function unit 150 serves as the non-serving cell for the radio terminals 10 located in the cell A to the cell C.

(Configuration of Cell)

Figure 4:
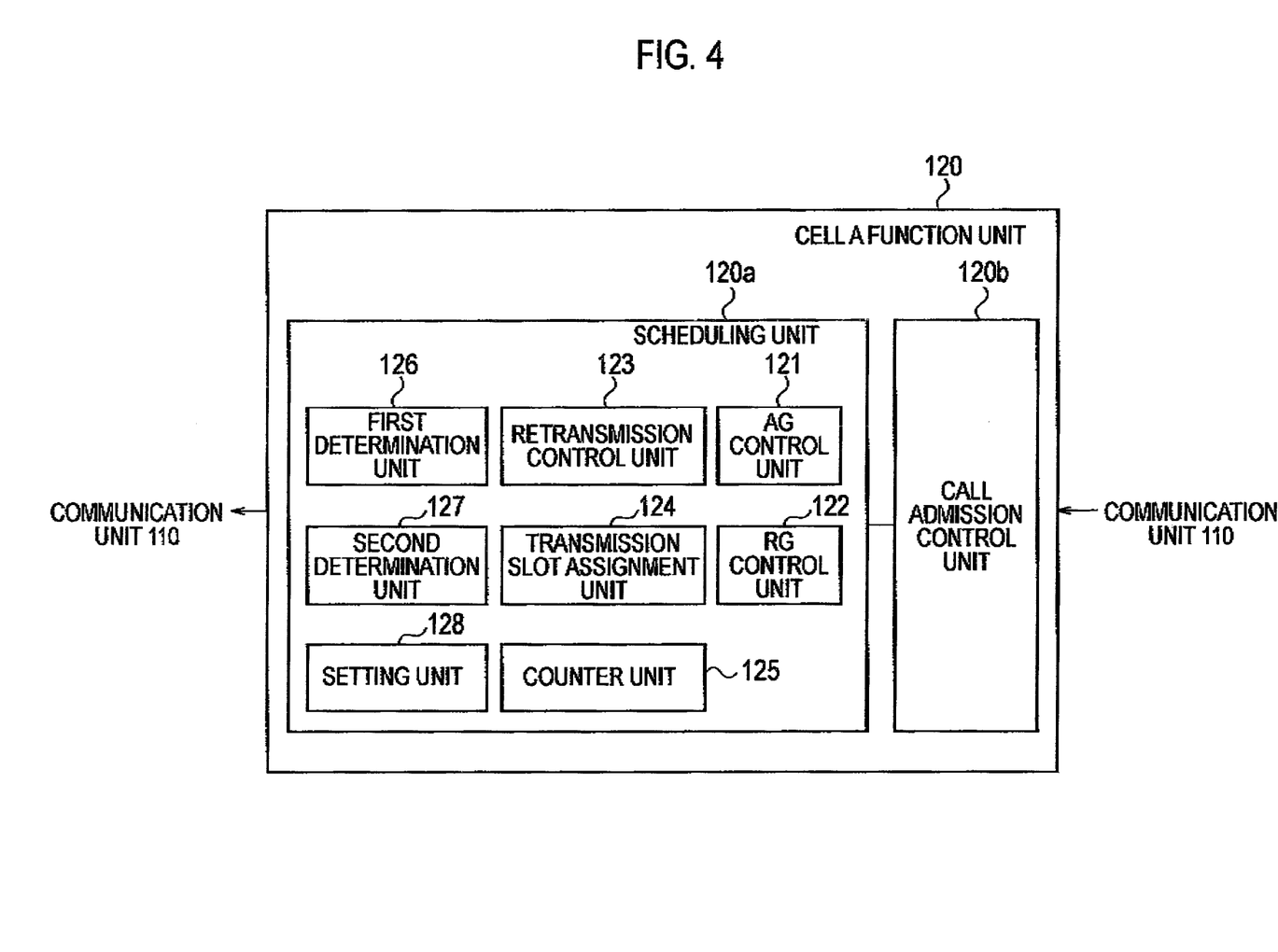
FIG. 4 is a block diagram showing a cell A function unit 120 according to the first embodiment of the present invention.

A configuration of the cell according to the first embodiment is described below with reference to the drawings. FIG. 4 is a block diagram showing the cell (cell A function unit 120) according to the first embodiment. Here, a case is described where the cell function unit A 120 functions as the serving cell.

As shown in FIG. 4, the cell A function unit 120 includes a scheduling unit 120a, and a call admission control unit 120b.

Firstly, the scheduling unit 120a assigns a radio resource (transmission rate, herein) to the radio terminal 10 using the cell A as the serving cell by transmitting transmission rate control data (AG and RG). Specifically, the scheduling unit 120a includes an AG control unit 121, an RG control unit 122, a retransmission control unit 123, a transmission slot assignment unit 124, a counter unit 125, a first determination unit 126, a second determination unit 227, and a setting unit 128. The scheduling unit 120a operates in a MAC-e (Media Access Control Enhanced) layer.

The AG control unit 121 transmits the AG to the radio terminal 10 (serving terminal) that uses the cell A as the serving cell through the E-AGCH. The AG is a command that directly specify the transmission rate value regardless of the current transmission rate. The AG transmission control unit 121 can transmit the AG at each TTI in the transmission of uplink data in accordance with 2-msec TTI. On the other hand the AG transmission control unit 121 cannot transmit the AG at each TTI in the transmission of uplink data in accordance with 10-msec TTI.

Here, the AG control unit 121 transmits to the radio terminal 10, AG (Inactive) requesting the radio terminal 10 to stop using the transmission time interval (i.e., processes included in one cycle) assigned to the radio terminal 10, AG (Zero Grant) specifying the transmission rate assigned to the radio terminal 10 as "0", (AG) specifying the transmission rate assigned to the radio terminal 10 as a guaranteed minimum transmission rate, and the like. The guaranteed minimum transmission rate is a minimum transmission rate that is to be at least guaranteed for the radio terminal 10.

Here, when the transmission rate for uplink user data is the minimum transmission rate, the AG control unit 121 suspends the transmission of the transmission rate control data (AG) for reducing the transmission rate for uplink data even when an event (rate lowering event) that decreases the transmission rate for uplink user data occurs.

The minimum transmission rate is the guaranteed minimum transmission rate corresponding to, for example, MAC-es Guaranteed Bit Rate. The minimum transmission rate may be a minimum guaranteed transmission rate for receiving data corresponding to Minimum Set E-TFCI. The minimum guaranteed transmission rate may be the minimum guaranteed transmission rate determined by the Minimum Set E-TFCI and a target receiving quality of the system.

The RG control unit 122 transmits the RG to the radio terminal 10 (serving terminal) using the cell A as the serving cell or the radio terminal 10 (non-serving terminal) using the cell A as the non-serving cell. The RG is the increase command "Up", the maintenance command "Hold", or the decrease command "Down". As described above, the increase command "Up" is the command instructing a predetermined range of increase, whereas the decrease command "Down" is the command instructing a predetermined range of decrease. In the transmission of uplink data in accordance with 2-msec TTI, the RG control unit 122 can transmit RG at each TTI. In the transmission of uplink data in accordance with 10-msec TTI, the RG control unit 122 cannot transmit RG at each TTI.

Here, when the transmission rate for uplink user data is the minimum transmission rate, the RG control unit 122 suspends the transmission of the transmission rate control data (RG) for decreasing the transmission rate for uplink user data even when an event (rate lowering event) that decreases the transmission rate for uplink user data occurs.

As described above, the minimum transmission rate is the guaranteed minimum transmission rate corresponding to, for example, MAC-es Guaranteed Bit Rate. The minimum transmission rate may be a minimum guaranteed transmission rate for receiving data corresponding to Minimum Set E-TFCI. The minimum guaranteed transmission rate may be the minimum guaranteed transmission rate determined by the Minimum Set E-TFCI and a target receiving quality of the system.

The AG control unit 121 and the RG control unit 122 controls the SG assigned to the radio terminal 10 by referring to the scheduling information received from the radio terminal 10 and the like.

The retransmission control unit 123 determines whether or not an error has occurred in the uplink data for each block (process). Then, the retransmission control unit 123 requests the radio terminal 10 to retransmit a block (hereinafter, error block) including the error. The retransmission technique is a HARQ (Hybrid Automatic Repeat Request) technique that combines the block (hereinafter, transmission block) originally transmitted from the radio terminal 10 and the block (hereinafter, retransmission block) retransmitted from the radio terminal 10.

The transmission slot assignment unit 124 assigns the radio terminal 10 a transmission slot (i.e., processes included in a single cycle) used for the transmission of the uplink data (block) transmitted through E-DPDCH. Note that the radio terminal 10 transmits the transmission block or the retransmission block to the base station 100 using the process (active process) assigned by the transmission slot assignment unit 124.

The counter unit 125 counts the number of times an event (hereinafter, rate lowering event) that decreases the transmission rate for uplink data has occurred. Specifically, the counter unit 125 counts the number of rate lowering event occurrences in a predetermined observation cycle. The predetermined observation interval is an interval having the length substantially the same as that of a call admission control interval. The predetermined observation interval may be synchronized with the call admission control cycle, or may not always be synchronized with the call admission control cycle. The call admission control cycle is a cycle in which the call admission control unit 120b controls the admission of calls as described later.

Possible rate lowering events are (1) a radio resource event, (2) an RTWP event, and (3) a wireline resource event.

(1) Radio Resource Event

The radio resource event is an event in which no radio resource can be assigned as the radio resource to be used for the admission of uplink data. The radio resource event may be an event in which a total resource assignment amount of the radio resources to be used for the reception of uplink data exceeds a resource amount threshold. The total resource assignment amount is a total amount of the radio resources assigned by the scheduling unit 120a. It is to be noted here that the radio resource event is an event common for all the radio terminals 10 (UE). The resource amount threshold is a target radio resource amount in a cell.

(2) RTWP Event

The RTWP (Received Total Wideband Power) event is an event in which the total receiving power (RTWP) in a bandwidth used for the reception of uplink data exceeds a receiving power threshold (target RTWP). It is to be noted here that the RTWP event is an event common for all the radio terminals 10 (UE).

The received total wideband power (RTWP) is a sum of noise power, receiving power (R99), interference power (R99), receiving power (serving), and interference power (non-serving). The target RTWP is a target RTWP in a cell.

The receiving power (R99) is receiving power for uplink user data received from the radio terminal 10 located in the cell through the DPDCH. The receiving power threshold (target RTWP) is receiving power for uplink user data received from the radio terminal 10 located in other cells through the DPDCH.

The receiving power (serving) is reception power for uplink user data received from a radio terminal 10 (serving terminal) using the cell as a serving cell through the E-DPDCH. The interference power (non-serving) is receiving power for uplink user data received from the radio terminal 10 (non-serving terminal) using the cell as a non-serving cell through the E-DPDCH.

(3) Wireline Resource Event

The wireline resource event includes a base station internal event and a wired transmission path event. It is to be noted here that the wireline resource event is an individual event for all the radio terminals 10 (UE).

The base station internal event is an event in which uplink data in a buffer provided in the base station 100 is discarded. Each buffer is provided in each radio terminal 10 (UE).

The wired transmission path event is an event in which uplink data is discarded in a wired transmission path established for each radio terminal 10 (UE). The discarding of the uplink data is detected by congestion information received from an upper level station (radio network controller, exchange, and the like) for example.

Here, the wired transmission path event may be an event in which a rate (discard rate) of uplink data being discarded in the wired transmission path exceeds a discard rate threshold. The wired transmission path event may be an event in which an amount (discard amount) of uplink data being discarded in the wired transmission path exceeds a discard amount threshold.

The wired transmission path may be shared by multiple base stations 100. The radio network controller 200 transmits to the base stations 100 congestion information (TNL Congestion Indication) indicating whether or not congestion has occurred in the wired transmission path (see, TS25.427 Ver, 7.5.0 5.14 "TNL Congestion Indication").

Here, the counter unit 125 updates the counted number value of rate lowering event occurrences even when the transmission of transmission rate control data for decreasing the transmission rate for uplink user data is suspended in the case of the occurrence of the rate lowering event.

The first determination unit 126 determines whether or not the transmission frequency of the transmission rate control data for decreasing the transmission rate for uplink data is equal to or higher than a predetermined frequency. The transmission rate control data is AG, RG, or the like. In the first embodiment, description is given with an assumption that the transmission rate control data is AG.

The transmission frequency of the transmission rate control data for decreasing the transmission rate for the uplink data is "the number of DOWN data transmission"/"the number of observation frames".

"The number DOWN data transmission" is the number of E-AGCHs to be used for the transmission of the AG for decreasing the transmission rate for uplink data from among all the E-AGCHs established within the predetermined observation cycle. "The number of DOWN data transmission" is initialized for each predetermined observation cycle.

It is to be noted that, when the rate lowering event has occurred in a UE with the current transmission rate of "Floor Grant", "the number of DOWN data transmission" is incremented even when the AG for decreasing the transmission rate for uplink data is not actually transmitted.

"The number of observation frames" is the number of E-AGCHs through which the AG for decreasing the transmission rate for uplink data can be transmitted from among all the E-AGCHs established within the predetermined observation cycle. In other words, "the number of observation frames" is a total number of frames in which the AG can be transmitted through the E-AGCH to at least any one of the UEs to which the E-AGCH is assigned within the predetermined observation cycle. "The number of observation frames" is initialized for each predetermined observation cycle.

The transmission frequency of the transmission rate control data (AG) is "the number of observation frames"/{("call admission control cycle"/"2 msec")×"the number of established E-AGCH"}.

The "call admission control cycle" is a cycle in which the call admission control unit 120b controls the admission of calls. "2 msec" is an example of an interval in which the scheduling unit 120a assigns the radio resources (transmission rate).

"The number of established E-AGCH" is the number of E-AGCHs established in a single process. "The number of established E-AGCH" is specified by, for example, a device (radio network controller 200, for example) other than the base station 100.

The second determination unit 127 determines whether or not the counted number value of rate lowering event occurrences exceeds the counted number threshold. More specifically, the second determination unit 127 determines whether or not the counted number value of rate lowering event occurrences in the predetermined observation cycle exceeds the counted number threshold.

It is to be noted here that the second determination unit 127 compares the counted number value and the counted number threshold every time a rate event occurs. More specifically, the counted number value is the counted number value of radio resource event occurrences, the counted number value of RTWP event occurrences, and the counted number value of wireline resource event occurrences. The counted number threshold is the counted number threshold of the radio resource event, the counted number threshold of the RTWP event, or the counted number threshold of the wireline resource event.

The setting unit 128 sets the admission permission information (admission permission flag herein) for determining whether or not to permit the admission of a new call. The setting unit 128 sets the admission permission flag to information (true) that permits the admission of a new call as a default value. On the other hand, the setting unit 128 sets the admission permission flag to information (false) for limiting (denying) the admission of a new call when the transmission frequency of the transmission rate control data for decreasing the transmission rate for uplink data is equal to or higher than the predetermined frequency and the counted number value exceeds the counted number threshold.

Here, the setting unit 128 sets the admission permission flag to the information (false) for limiting (denying) the admission of a new call in the following case. Specifically, the information (false) is set when counted number value of any one of the radio resource event, the RTWP event, and the wireline resource event exceeds the counted number threshold, provided that the transmission frequency of the transmission rate control data for decreasing the transmission rate for uplink data is equal to or higher than the predetermined frequency.

It is to be noted that the call admission control unit 120b can refer to the admission permission flag. For example, the scheduling unit 120a notifies the call admission control unit 120b of the permission admission flag. The admission permission flag may be notified in a predetermined cycle, or may be notified when the value of the admission permission flag changes.

Secondly, the call admission control unit 120b controls the admission of calls by the radio terminal 10 using the cell A as a serving cell. The call admission control unit 120b controls the admission of calls in the call admission control cycle. More specifically, the call admission control unit 120b determines whether or not to receive a new call based on the permission admission information (admission permission flag) set by the scheduling unit 120a.

(Operation of Base Station (Cell))

Figure 6:
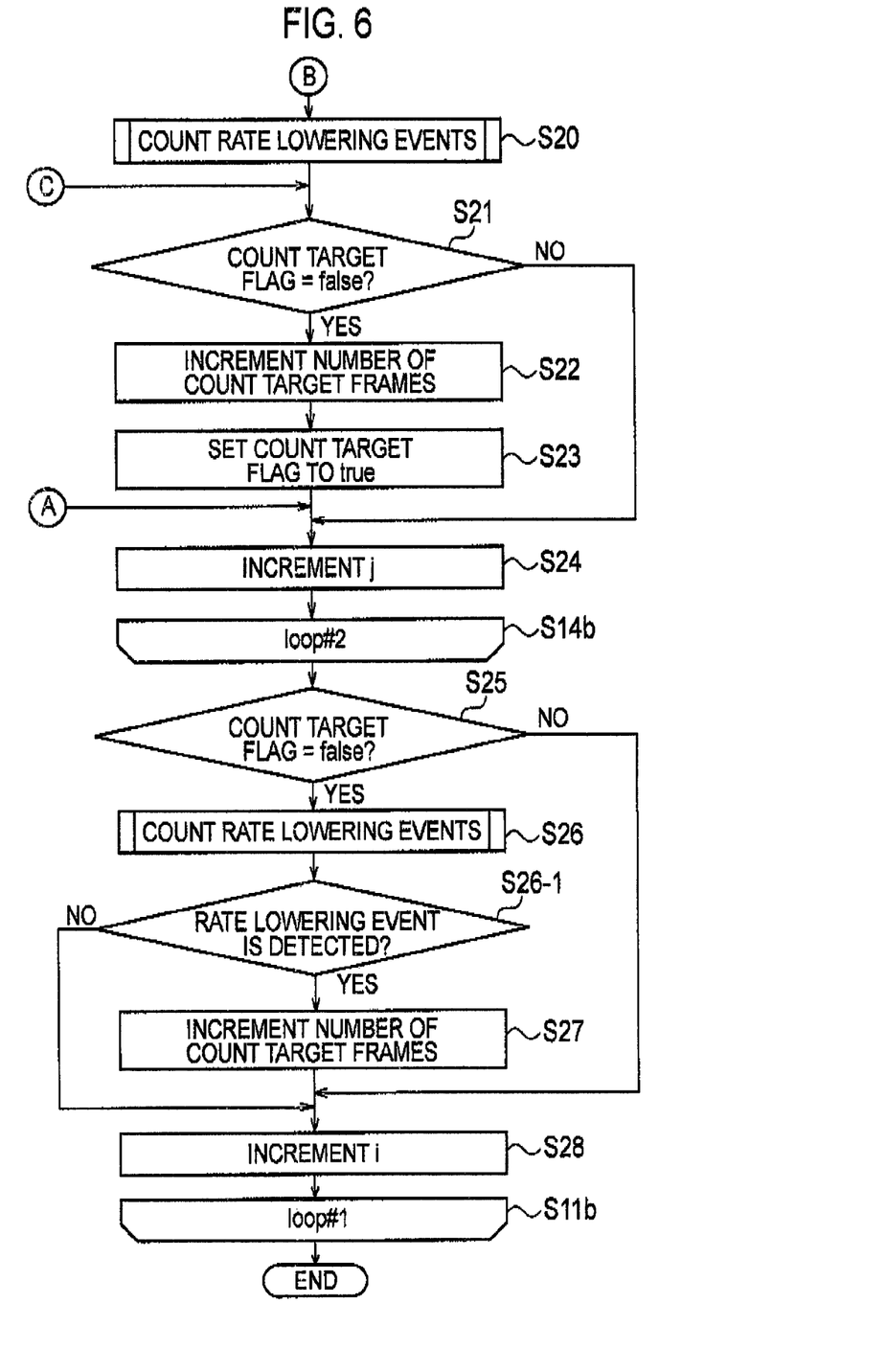
FIG. 6 is a flowchart showing an operation of the base station (cell) 100 according to the first embodiment of the present invention.

An operation of the base station (cell) according to the first embodiment is described below with reference to the drawings. FIG. 6 is a flowchart showing an operation of the base station 100 (cell) according to the first embodiment. Here, an operation of the scheduling unit 120a is mainly described.

Figure 5:
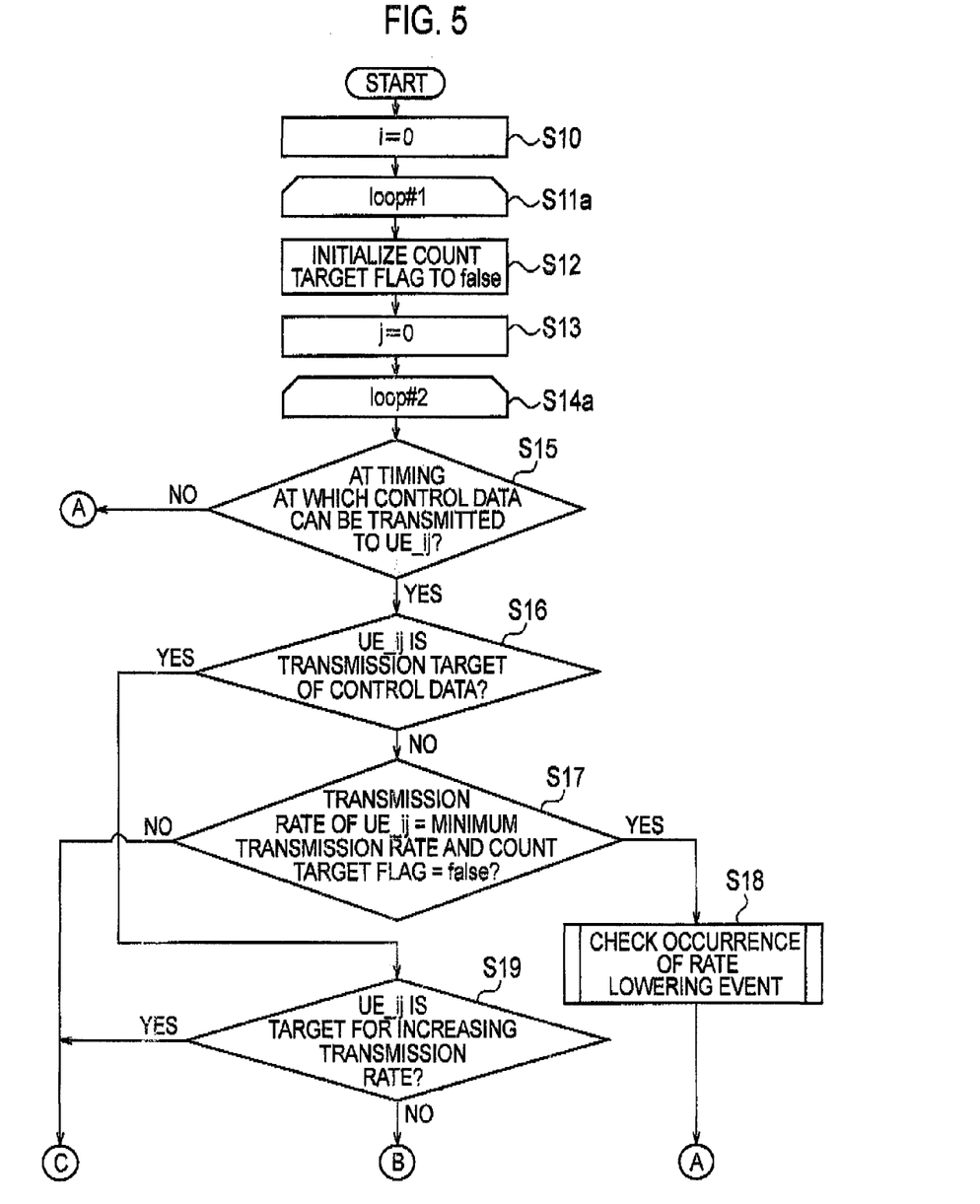
FIG. 5 is a flowchart showing an operation of the base station (cell) 100 according to the first embodiment of the present invention.

Firstly, processing in which the scheduling unit 120a counts the rate lowering events is described with reference to FIG. 5 and FIG. 6. The process in FIG. 5 and FIG. 6 is performed in an interval (e.g., 2 msec) in which the scheduling unit 120a assigns a radio resource (transmission rate). In other words, the processing in FIG. 5 and FIG. 6 is performed for every process.

As shown in FIG. 6, the scheduling unit 120a sets "i" to "0" in Step 10. "i" is a value used for counting the E-AGCHs associated with the process to be controlled.

In Step 11a (FIG. 5) to step 11b (FIG. 6), the scheduling unit 120a performs loop processing (loop #1). The scheduling unit 120a performs processing between the Step 11a to 11b until the "i" value reaches the number of established E-AGCHs.

In Step 12 the scheduling unit 120a initializes a count target flag to "false". The count target flag is used to determine whether or not the AG has been transmitted through an E-AGCH #i . The count target flag is used to determine whether or not to count the E-AGCH #i as the number of an observation target frame.

The scheduling unit 120a initializes a radio resource event flag, an RTWP resource flag, and a wireline resource event flag to "false". These flags are used to check whether or not a rate lowering event has occurred in the radio terminal 10 to which the minimum guaranteed transmission rate is assigned.

The scheduling unit 120a sets "j" to "0" in Step 13. "j" is a value used for counting the radio terminals 10 (UE) associated with the E-AGCHs #i.

In Step 14a (FIG. 5) to Step 14b (FIG. 6), the scheduling unit 120a performs loop processing (loop #2). The scheduling unit 120a performs processing between the Step 14a to 14b until the "j" value reaches the total number of radio terminals 10 (UE) to which AG is to be transmitted in the E-AGCHs.

In Step 15, the scheduling unit 120a determines whether or not the control target process is at a timing at which AG can be transmitted to a UE_ij. The scheduling unit 120a proceeds to processing in step 16 when the control target process is at the timing at which AG can be transmitted to the UE_ij. The scheduling unit 120a proceeds to processing in Step 24 (FIG. 6) when the control target process is not at the timing at which AG can be transmitted to the UE_ij.

Here, if the transmission rate of the UE_ij is "Zero Grant", the scheduling unit 120a may not always proceed to the processing in Step 16 and proceed to the processing in Step 24 (FIG. 6) even when the control target process is at the timing at which AG can be transmitted to the UE_ij. Thus, the number of counted target frames (the number of observation target frames) is not incremented at the timing at which the transmission rate control information (AG) can be transmitted to the UE_ij with a current transmission rate of "Zero Grant".

In Step 16, the scheduling unit 120a determines whether or not the UE_ij is a transmission target. The scheduling unit 120a proceeds to processing in Step 19 when the UE_ij is the transmission target. The scheduling unit 120a proceeds to processing in Step 17 when the UE_ij is not the transmission target.

In Step 17, the scheduling unit 120a determines whether or not the transmission rate of the UE_ij is the minimum transmission rate and the count target flag is set to "false". When the conditions are satisfied, the scheduling unit 120a proceeds to processing in Step 18. When the conditions are not satisfied, the scheduling unit 120a proceeds to processing in Step 21 (FIG. 6).

The minimum transmission rate is the guaranteed minimum transmission rate corresponding to, for example, MAC-es Guaranteed Bit Rate. The minimum transmission rate may be a minimum guaranteed transmission rate for receiving data corresponding to Minimum Set E-TFCI. The minimum guaranteed transmission rate may be the minimum guaranteed transmission rate determined by the Minimum Set E-TFCI and a target receiving quality of the system.

In Step 18, the scheduling unit 120a checks the rate lowering event. More specifically, the scheduling unit 120a first checks whether or not the radio resource event has occurred in the E-AGCH #i. When the radio resource event has occurred, the scheduling unit 120a sets "true" to the radio resource event flag.

When no radio resource event has occurred, the scheduling unit 120a secondly checks whether or not the RTWP event has occurred in the E-AGCH #i. When the RTWP resource event has occurred, the scheduling unit 120a sets "true" to the RTWP resource event flag.

The scheduling unit 120a thirdly checks whether or not the wireline resource event has occurred concerning the UE_ij in the E-AGCH #i . When the wireline resource event has occurred, the scheduling unit 120a sets "true" to the wireline resource event.

In Step 19, the scheduling unit 120a determines whether or not the UE_ij is a target for increasing transmission rate. The scheduling unit 120a proceeds to processing in Step 21 (FIG. 6) when the UE_ij is the target for increasing transmission rate. The scheduling unit 120a proceeds to processing in Step 20 (FIG. 6) when the UE_ij is not the target for increasing transmission rate.

As shown in FIG. 6, in Step 20, the scheduling unit 120a acquires the counted number value of rate lowering event occurrences. The scheduling unit 120a acquires the counted number value of rate lowering event occurrences every time the rate lowering event occurs.

Specifically, the scheduling unit 120a firstly increments the counted number value of the radio resource event by "1" if a radio resource event has occurred in the E-AGCH #i.

When the radio resource event has not occurred, the scheduling unit 120a secondly increments the counted number value of the RTWP event by "1" if an RTWP event has occurred in the E-AGCH #i.

When the RTWP event has not occurred, the scheduling unit 120a thirdly increments the counted number value of the wireline resource event by "1" if a wireline resource event has occurred in the E-AGCH #i.

In Step 21, the scheduling unit 120a determines whether or not the count target flag is set to "false". When the count target flag is set to "false", the scheduling unit 120a proceeds to processing in Step 22. When the count target flag is set to "true", the scheduling unit 120a proceeds to processing in Step 24.

In Step 22, the scheduling unit 120a increments the number of count target frames. More specifically, the scheduling unit 120a increments the number of count target frames by "1".

In Step 23 the scheduling unit 120a sets the count target flag to "true".

In Step 24, the scheduling unit 120a increments "j". More specifically, the scheduling unit 120a increments "j" by "1".

In Step 25, the scheduling unit 120a determines whether or not the count target flag is set to "false". When the count target flag is set to "false", the scheduling unit 120a proceeds to processing in Step 26. When the count target flag is set to "true", the scheduling unit 120a proceeds to processing in Step 28.

In Step 26, the scheduling unit 120a acquires the counted number value of rate lowering event occurrences. The scheduling unit 120a acquires the counted number value of rate lowering event occurrences every time the rate lowering event occurs.

Specifically, the scheduling unit 120a firstly increments the counted number value of the radio resource event by "1" if the radio resource event flag is set to "true".

The scheduling unit 120a secondly increments the counted number value of the RTWP event by "1" if the RTWP event flag is set to "true".

The scheduling unit 120a thirdly increments the counted number value of the wireline resource event by "1" if the wireline resource event flag is set to "true".

The count target flag is set to "true" in Step 23 when rate lowering events are counted in Step 20 for the radio terminal 10 to which the transmission rate higher than the minimum guaranteed transmission rate is assigned. It is to be noted that when the processing in Step 20 is performed, the processing in Step 26 is not performed due to the determination in Step 25.

In other words, the processing in Step 26 is performed when no rate lowering event has occurred in the radio terminal 10 to which the transmission rate higher than the minimum guaranteed transmission rate is assigned.

In Step 26-1, the scheduling unit 120a determines whether or not a rate lowering event is detected in Step 26. When the rate lowering event is detected, the scheduling unit 120a proceeds to processing in Step 27. When no rate lowering event is detected, the scheduling unit 120a proceeds to processing in Step 28.

In Step 27, the scheduling unit 120a increments the number of count target frames. More specifically, the scheduling unit 120a increments the number of count target frames by "1".

In Step 28, the scheduling unit 120a increments "j". More specifically, the scheduling unit 120a increments "j" by "1".

Figure 7:
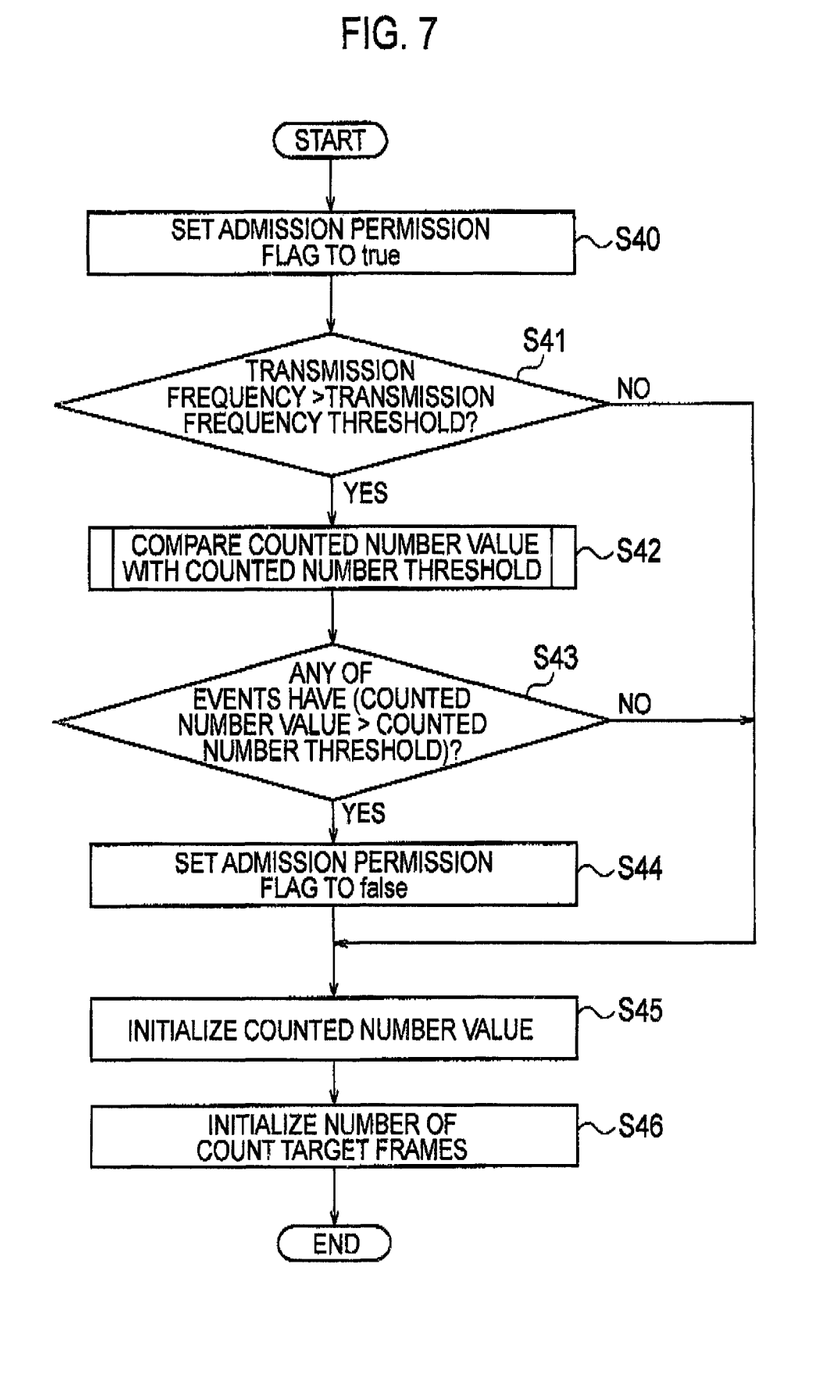
FIG. 7 is a flowchart showing an operation of the base station (cell) 100 according to the first embodiment of the present invention.

Secondly, processing of setting the admission permission flag by the scheduling unit 120a is described with reference to FIG. 7. The processing in FIG. 7 is performed in the predetermined observation cycle. The predetermined observation cycle is a cycle having a length substantially the same as that of the call admission control cycle. The predetermined observation cycle may be synchronized with the call admission control cycle, or may not always be synchronized with the call admission control interval.

As shown in FIG. 7, the scheduling unit 120a sets the admission permission flag to "true" in Step 40.

In Step 41 the scheduling unit 120a determines whether or not the transmission frequency of the transmission rate control data (AG) for decreasing the transmission rate for uplink data exceeds a transmission frequency threshold. The scheduling unit 120a proceeds to processing in Step 42 when the transmission frequency exceeds the transmission frequency threshold. The scheduling unit 120a proceeds to processing in Step 45 when the transmission frequency does not exceed the transmission frequency threshold.

In Step 42, the scheduling unit 120a compares the counted number value with the counted number threshold. Here, the scheduling unit 120a compares the counted number value with the counted number threshold for each of the rate lowering events. Specifically, the scheduling unit 120a firstly compares the counted number value of the radio resource events with the counted number threshold of the radio resource event. The scheduling unit 120a secondly compares the counted number value of the RTWP events with the counted number threshold of the RTWP event. The scheduling unit 120a thirdly compares the counted number value of the wireline resource events with the counted number threshold of the wireline resource event.

In Step 43 the scheduling unit 120a determines whether or not any of the events have the counted number value exceeding the counted number threshold. The scheduling unit 120a proceeds to processing in Step 44 if any of the events have the counted number value exceeding the counted number threshold. The scheduling unit 120a proceeds to the processing in Step 45 if none of the events have the counted number value exceeding the counted number threshold.

In Step 44, the scheduling unit 120a sets the admission permission flag to "false". Thus, the admission of a new call is limited (denied) at least until a timing at which the admission permission flag is updated next.

The scheduling unit 120a initializes the counted number value of rate lowering event occurrences in Step 45. In other words, the scheduling unit 120a resets the counted number value of rate lowering event occurrences.

The scheduling unit 120a initializes the number of count target frames in Step 46. In other words, the scheduling unit 120a resets the number of count target frames.

(Advantageous Effect)

In the first embodiment, the call admission control unit 120b determines whether or not to permit the admission of a new call based on the permission admission flag set by the scheduling unit 120a.

Thus, the call admission control unit 120b does not need to inquire of the scheduling unit 120a the radio resource assigned for the admission of uplink data every time a new call is received. Thus, the call admission control unit 120b can promptly determine whether or not the admission of a new call can be permitted.

In the first embodiment, the scheduling unit 120a sets the admission permission flag to information for limiting (denying) the admission of a new call when the transmission frequency of the transmission rate control data for reducing the transmission rate for uplink data is equal to or higher than the transmission frequency threshold, and the counted number value of rate lowering event occurrences exceeds the counted number threshold.

Here, it is highly likely that there is no capacity for permitting the admission of a new call when the transmission frequency of the transmission rate control data for reducing the transmission rate for uplink data is equal to or higher than the transmission frequency threshold. Also, it is highly likely that there is no capacity for permitting the admission of a new call when the counted number value of rate lowering event occurrences exceeds the counted number threshold.

In the first embodiment, the scheduling unit 120a sets the admission permission flag to the information for limiting (denying) the admission of a new call while taking into consideration both the transmission frequency of the transmission rate control data for reducing the transmission rate for uplink data and the counted number value of the rate lowering events. Thus, the admission of a new call can be appropriately limited (denied).

In the first embodiment, the scheduling unit 120a updates the counted number value of rate lowering event occurrences even when the transmission of the transmission rate control data for decreasing the transmission rate for uplink data is suspended.

Here, a possible case in which the transmission rate control data for decreasing the transmission rate for uplink data is not transmitted is a case in which the transmission rate assigned to the radio terminal 10 (UE) has already lowered to the minimum guaranteed transmission rate. The counted number value of rate lowering event occurrences can be appropriately updated even in such a case.

In the first embodiment, the respective counted number values of the RTWP event and the radio resource event are used as the counted number values of the respective rate lowering events common for all the radio terminals 10 (UE). The counted number value of the wired transmission path events is used as the counted number value of the individual rate lowering event for each of the radio terminals 10 (UE). Thus, the admission of a new call can be appropriately limited (denied).

[Other Embodiment]

As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

In the embodiment, the EUL (Enhanced Uplink) is exemplarily shown. However, the embodiment is not limited to this. The embodiment can be applied to communications in which each of the scheduling unit 120a and the call admission control unit 120b operates independently. For example, the scheduling unit 120a may be provided to the base station 100 while the call admission control unit 120b is provided to an upper level station such as the radio network controller 200 and the like.

In the embodiment, the scheduling unit 120a sets the admission permission flag to information (false) for limiting (denying) the admission of a new call in the following case. Specifically, the information (false) is set when the counted number value of any one of the radio resource events, the RTWP events, and the wireline resource events exceeds the counted number threshold, provided that the transmission frequency of the transmission rate control data for decreasing the transmission rate for uplink data is equal to or higher than the predetermined frequency. However, the embodiment is not limited to this.

For example, the scheduling unit 120a may set the admission permission flag to information (false) for limiting (denying) the admission of a new call when the counted number values of any two of the radio resource events, the RTWP events, and the wireline resource events respectively exceed the counted number thresholds, provided that the transmission frequency of the transmission rate control data for decreasing the transmission rate for uplink data is equal to or higher than the predetermined frequency.

Similarly, the scheduling unit 120a may set the admission permission flag to information (false) for limiting (denying) the admission of a new call when the counted number values of all of the radio resource events, the RTWP events, and the wireline resource events respectively exceed the counted number thresholds, provided that the transmission frequency of the transmission rate control data for decreasing the transmission rate for uplink data is equal to or higher than the predetermined frequency.

In the embodiment, the transmission frequency of the transmission rate control data for decreasing the transmission rate for uplink data is represented by "the number of DOWN data transmission"/"the number of observation target frames". However, the embodiment is not limited thereto. The transmission frequency of the transmission rate control data for decreasing the transmission rate for uplink data may be represented by the ratio of TTIs (processes) in which the transmission rate control data for decreasing the transmission rate for uplink data is transmitted to the total TTIs (processes).

In the embodiment, 10-msec TTI is only provided as an example of a first transmission time interval. Similarly, 2-msec TTI is only provided as an example of a second transmission time interval. Accordingly, the transmission time interval of the uplink data is naturally not limited to 2 msec and 10 msec. Here, the radio resource is not controlled for each transmission time interval in the transmission of the uplink data in accordance with the first transmission time interval. On the other hand, the radio resource is controlled for each transmission time interval in the transmission of the uplink data in accordance with the second transmission time interval.

According to the present invention, it is possible to provide the radio a radio communication system, and a radio communication method that can perform the admission control of a new call appropriately and promptly.

The invention claimed is:

1. A base station comprising:
a scheduling unit configured to assign a radio resource used for receiving uplink data by transmitting transmission rate control data for controlling transmission rate for uplink data; and
a call admission control unit configured to control an admission of a call, wherein the scheduling unit comprises:
   a first determination unit configured to determine whether or not a transmission frequency of transmission rate control data for decreasing transmission rate for uplink data is equal to or higher than a transmission frequency threshold,
   a second determination unit configured to determine whether or not a counted number value of rate lowering event occurrences exceeds a counted number threshold, the rate lowering event being an event that decreases transmission rate for uplink data, and
   a setting unit configured to set admission permission information to information for limiting an admission of a new call in a case where the transmission frequency is equal to or higher than the transmission frequency threshold, and where the counted number value of rate lowering event occurrences exceeds the counted number threshold, and the call admission control unit determines whether or not to permit the admission of a new call based on the admission permission information set by the scheduling unit.

2. The base station according to claim 1, wherein
the scheduling unit further includes:
   a first transmission unit configured to transmit the transmission rate control data for decreasing transmission rate for uplink data, upon occurrence of the rate lowering event; and
   a counter unit configured to count the number of rate lowering event occurrences,
when transmission rate for uplink data is a minimum transmission rate, the first transmission unit suspends the transmission of the transmission rate control data for decreasing transmission rate for uplink data even when the rate lowering event occurs, and
the counter unit updates the counted number value of rate lowering event occurrences even when the transmission of the transmission rate control data for decreasing transmission rate for uplink data is suspended.

3. The base station according to claim 1, wherein the rate lowering event is an event in which total receiving power in a bandwidth used for the reception of uplink data exceeds a receiving power threshold.

4. The base station according to claim 1, wherein the rate lowering event is an event in which there is no radio resource assignable as the radio resource used for the reception of uplink data.

5. The base station according to claim 1, wherein the rate lowering event is an event in which a total resource assignment amount of the radio resources used for the reception of uplink data exceeds a resource amount threshold.

6. The base station according to claim 1, wherein
the scheduling unit further includes a second transmission unit configured to transmit uplink data to an upper level station through a wired transmission path, and
the rate lowering event is an event in which uplink data is discarded in the wired transmission path.

7. The base station according to claim 1, wherein the rate lowering event is an event in which uplink data is discarded in the base station.

8. A radio communication system comprising:
a scheduling unit configured to assign a radio resource used for receiving uplink data by transmitting transmission rate control data for controlling transmission rate for uplink data; and
a call admission control unit configured to control an admission of a call, wherein the scheduling unit includes:
   a first determination unit configured to determine whether or not a transmission frequency of transmission rate control data for decreasing transmission rate for uplink data is equal to or higher than a transmission frequency threshold,
   a second determination unit configured to determine whether or not a counted number value of rate lowering event occurrences exceeds a counted number threshold, the rate lowering event being an event that decreases transmission rate for uplink data, and
   a setting unit configured to set admission permission information to information for limiting an admission of a new call in a case where the transmission frequency is equal to or higher than the predetermined frequency, and where the counted number value of rate lowering event occurrences exceeds the counted number threshold, and the call admission control unit determines whether or not to permit the admission of a new call based on the admission permission information set by the scheduling unit.

9. A radio communication method comprising:

step A of assigning a radio resource used for receiving uplink data by transmitting transmission rate control data for controlling transmission rate for uplink data;

step B of determining whether or not a transmission frequency of transmission rate control data for decreasing transmission rate for uplink data is equal to or higher than a transmission frequency threshold;

step C of determining whether or not a counted number value of rate lowering event occurrences exceeds a counted number threshold, the rate lowering event being an event that decreases transmission rate for uplink data;

step D of setting admission permission information to information for limiting an admission of a new call in a case where the transmission frequency is equal to or higher than the predetermined frequency, and where the counted number value of rate lowering event occurrences exceeds the counted number threshold; and step E of determining whether or not to permit the admission of a new call based on the admission permission information set by the step D.

* * * * *